UNITED STATES PATENT OFFICE.

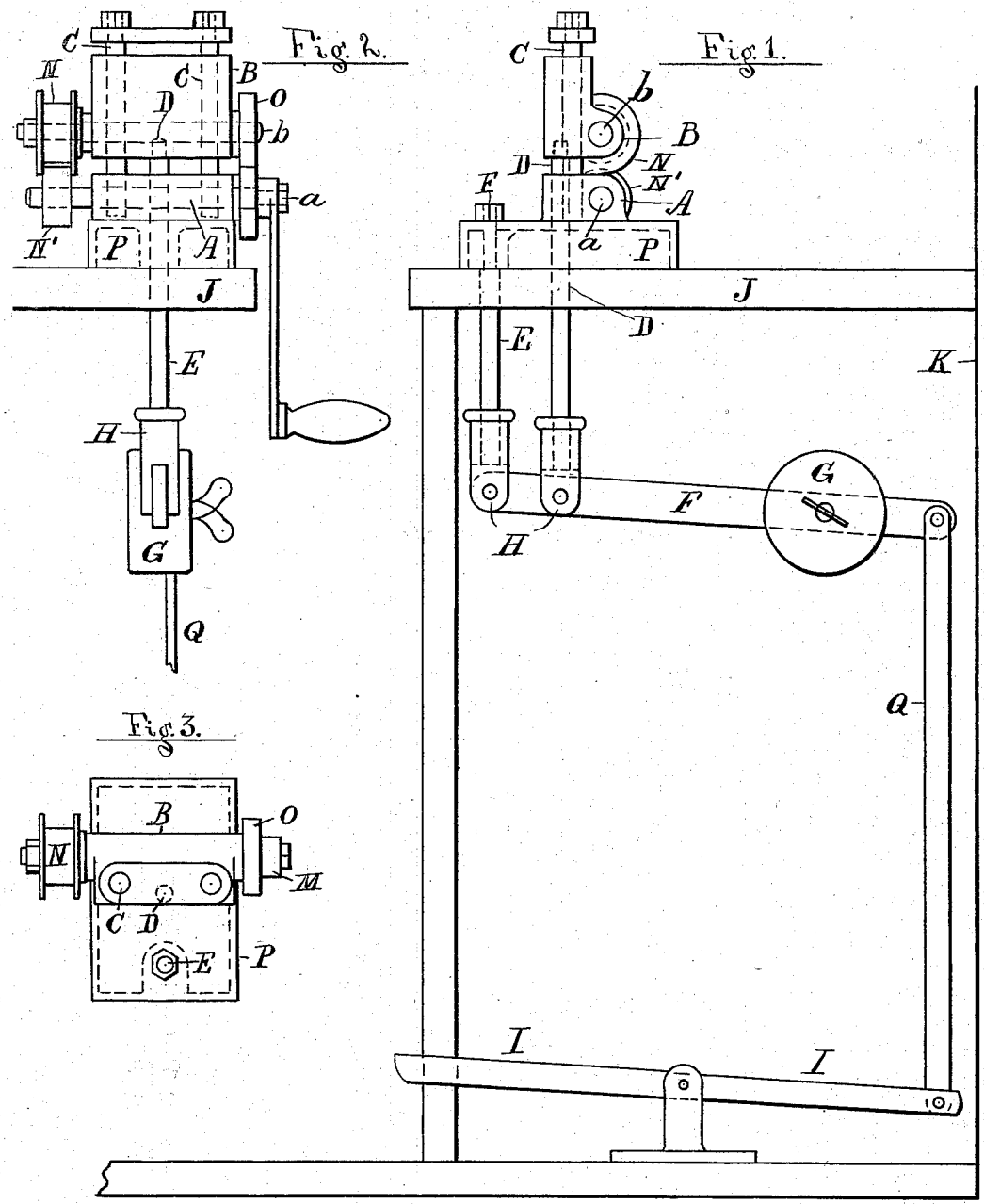

HENRY F. OSBORNE, OF NEWARK, NEW JERSEY.

CREASING-MACHINE.

SPECIFICATION forming part of Letters Patent No. 276,271, dated April 24, 1883.

Application filed September 9, 1882. (No model.)

*To all whom it may concern:*

Be it known that I, HENRY F. OSBORNE, a citizen of the United States, residing in the city of Newark, in the county of Essex and State of New Jersey, have invented certain new and useful Improvements in Creasing-Machines, fully described and represented in the following specification and the accompanying drawings, forming a part of the same.

This invention consists in certain attachments to a saddler's bench creasing-machine, whereby its use is greatly facilitated and the operator enabled to use his hands more effectively.

In the annexed drawings, Figure 1 is a transverse section or end view of a bench, J, and a creasing-machine provided with my improvements, the wall of the work-shop being indicated at K and the floor at L. Fig. 2 is a side view of the same, the end of the bench being shown with the handle of the machine overhanging such end; and Fig. 3 is a plan of the machine detached from the bench.

P is the bed of the machine, provided with a bearing, $a$, for the stationary spindle A, and with guide-rods C for holding the movable bearing B over the bearing A to carry the movable spindle $b$.

The handle is shown at M, and the creasing-rollers respectively at N and N', and the connecting-gears at O.

My improvements consist in combining with such a machine and the supporting-bench J a connection, D, from the movable bearing B, extending it all the way through the bed P and bench J, and uniting it to a lever, F, provided with a pressure-weight, G. I am thus enabled, without adding anything to the bulk of the machine or the space it occupies upon the work-bench, to substitute an adjustable and durable weight for the weak and ineffective springs heretofore used for the same purpose.

By placing a treadle, I, upon the floor beneath the lever F and connecting it to the lever by a rod, Q, as shown, the operator can regulate the pressure somewhat by his foot, and can separate the creasing-rolls at pleasure for the insertion of the leather, thus leaving the hands of the operator more at liberty than heretofore. The fulcrum for the lever F is formed by the insertion of a hanger-rod, E, in the lower side of the bed P, as shown in Figs. 1 and 3; and as the connection D and rod E require for the convenient mounting of the machine upon the work-bench J to be passed through holes in the leather, I have shown them provided with joints H, adapted to screw on and off of the rods D and E, and also capable, by the screw connecting them to such rods, of vertical adjustment thereon when required. By such construction, the machine can be mounted upon any bench by making two holes therein, and the lever F adjusted in a horizontal position by the screw-joints H, as described. The clumsier parts of the machine are by these means put entirely out of the way, and all the advantages of a large and firm construction secured without increasing the apparent bulk of the machine.

I am aware that it is not new to use a treadle for analogous purposes to that for which I use it in my present invention, as such a use may be found in United States Patent No. 160,231, issued February 23, 1875; but my invention consists in the construction whereby the machine is rendered entirely complete without the treadle for certain uses, and may be thus mounted and used, and in the combination, with such specific construction, of the treadle F and rod Q, arranged as shown, for securing additional uses of the machine.

I claim my invention as follows:

1. The combination, in a creasing-machine having the spindles mounted, one in a stationary bearing, A, and the other in a movable bearing, B, guided by rods C, of the movable bearing B, connecting-rod D, hanger-rod E, lever F, and weight G, the whole arranged and operated, in combination with the stationary bearing A and the creasing-wheel spindles, substantially as shown and described.

2. The combination, with the movable bearing B, connecting-rod D, hanger-rod E, lever F, and weight G, the whole arranged and combined with the stationary bearing A and bed P, as described, of the treadle I and rod Q, connected with lever F, as and for the purpose set forth.

3. The combination, with the stationary bearing A, movable bearing B, and rods D and E, passed through a work-bench, as described, of the screw-lever joints H H and the lever F, arranged and operated as set forth.

In testimony whereof I have hereunto set my hand in the presence of two subscribing witnesses.

H. F. OSBORNE.

Witnesses:
W. F. D. CRANE,
THOS. S. CRANE.